US011792442B2

United States Patent
Björkman et al.

(10) Patent No.: US 11,792,442 B2
(45) Date of Patent: Oct. 17, 2023

(54) METHODS AND SYSTEMS FOR PROVIDING A USER WITH AN IMAGE CONTENT

(71) Applicant: Tension Technology AB, Falun (SE)

(72) Inventors: Magnus Björkman, Falun (SE); Mats Persson, Falun (SE); Tomas Jakobsson, Falun (SE)

(73) Assignee: TENSION TECHNOLOGY AB, Falun (SE)

( * ) Notice: Subject to any disclaimer, the term of this patent is extended or adjusted under 35 U.S.C. 154(b) by 13 days.

(21) Appl. No.: 17/608,438

(22) PCT Filed: May 18, 2020

(86) PCT No.: PCT/SE2020/050512
§ 371 (c)(1),
(2) Date: Nov. 2, 2021

(87) PCT Pub. No.: WO2020/231322
PCT Pub. Date: Nov. 19, 2020

(65) Prior Publication Data
US 2022/0201342 A1    Jun. 23, 2022

Related U.S. Application Data

(60) Provisional application No. 62/848,690, filed on May 16, 2019.

(51) Int. Cl.
*H04N 21/2187*    (2011.01)
*H04N 21/218*    (2011.01)
(Continued)

(52) U.S. Cl.
CPC ... *H04N 21/2187* (2013.01); *H04N 21/21805* (2013.01); *H04N 21/231* (2013.01);
(Continued)

(58) Field of Classification Search
CPC ......... H04N 21/2187; H04N 21/21805; H04N 21/231; H04N 21/2343; H04N 21/2743; H04N 21/6587; H04N 21/8547
See application file for complete search history.

(56) References Cited

U.S. PATENT DOCUMENTS

2010/0278508 A1    11/2010 Aggarwal
2013/0222583 A1*    8/2013 Earnshaw ............... H04N 5/222
348/143
(Continued)

FOREIGN PATENT DOCUMENTS

WO    2011/143342 A1    11/2011

OTHER PUBLICATIONS

International Search Report from corresponding International Application No. PCT/SE2020/050512, dated Sep. 1, 2020, 4 pages.
(Continued)

*Primary Examiner* — Alazar Tilahun
(74) *Attorney, Agent, or Firm* — TUCKER ELLIS LLP

(57) ABSTRACT

Systems and methods are provided for processing images. The system comprises at least one image recorder (20) adapted to: record a series of images, generate a set of image data for each image in the series of the recorded images; a first control unit configured to: modify each set of image data and generate a first type of image frame (25) by providing each set of image data with an identity of said image recorder (20) and a timestamp, and transmit each first type of image frame (25); at least one second control unit (10; 40) configured to: receive said first type of image frame (25), process each first type of image frame (25) and generate a second type of image frame (25') by modifying each type of image frame (25), and transmit to a user and/or store each second type of image frames (25').

14 Claims, 11 Drawing Sheets

(51) Int. Cl.
*H04N 21/231* (2011.01)
*H04N 21/2343* (2011.01)
*H04N 21/2743* (2011.01)
*H04N 21/6587* (2011.01)
*H04N 21/8547* (2011.01)

(52) U.S. Cl.
CPC ..... *H04N 21/2343* (2013.01); *H04N 21/2743* (2013.01); *H04N 21/6587* (2013.01); *H04N 21/8547* (2013.01)

(56) References Cited

U.S. PATENT DOCUMENTS

| | | |
|---|---|---|
| 2014/0072270 A1 | 3/2014 | Goldberg |
| 2014/0027684 A1 | 9/2014 | Evans |
| 2015/0310895 A1 | 10/2015 | Shen |
| 2016/0205341 A1* | 7/2016 | Hollander ............... H04N 19/46 375/240.08 |
| 2018/0204381 A1* | 7/2018 | Kanatsu ................. G06T 7/248 |
| 2018/0255332 A1* | 9/2018 | Heusser ................. H04H 20/18 |

OTHER PUBLICATIONS

Luis Rodriguez-gil, et al., "An Open and Scalable Web-Based Interactive Live-Steaming architecture: The WILSP Platform," IEEE Acess, published Jun. 1, 2017, 15 pages.
International Preliminary Report on Patentability from corresponding International Application No. PCT/SE2020/050512, dated Sep. 15, 2021, 19 pages.
Extended European Search Report from corresponding European Patent Application No. 20806223.2, dated Jan. 3, 2023, 9 pages.

* cited by examiner

METHODS AND SYSTEMS FOR PROVIDING A USER WITH AN IMAGE CONTENT

TECHNICAL FIELD

The present invention generally relates to methods and systems for processing image data for use by a user and providing visual information to a user in substantially real time in particular.

BACKGOUND

A digital camera comprises an image sensor, such as a charge-coupled device (CCD) or complementary metal oxide semiconductor (CMOS) technology, or similar. The image sensor convert light into electrical charges. The camera takes a rapid sequence of photographs on the image sensor. In contrast to a still camera, which captures a single snapshot at a time, the movie camera takes a series of images; each image constitutes a "frame".

Data streaming in the form of audio and video streaming is well known and utilized in many applications as a means of providing a user of the application with real time moving pictures of for example sports' events or concerts. "EUROSPORT PLAYER" for sports and "LIVELIST" for concerts are two popular examples, both available as applications for web, mobile devices and more. Thus, allowing the user to watch an event while it is happening and while it is streamed (being transmitted to the application), although generally with a certain time delay of the video stream, normally in the range of 30 to 120 seconds or more.

Typically, a time delay in video streaming depends partly on the bandwidth of the network, i.e. how fast data can be transmitted over the network and partly on any time delay introduced when the raw video stream is stored (buffered) for encoding. The encoding time may for example depend on the encoding scheme, as well as during any further transcoding required to distribute the stream to different clients, storing of video segments by the client ("buffering") and finally decoding of the video stream.

To limit the bandwidth required for streaming, the video stream is encoded in segments. A segment is a sequence of parts with internal dependencies, i.e. a key-frame/intra-frame followed by frames containing only incremental information since the last key-frame. The encoder must wait until all frames for the segment have been received before encoding the segment. To view the segment the player application must first download one or several whole segments and store it in a process known as "buffering."

The encoding, segmentation and buffering processes (each) introduce latencies and delays. For reference, the minimum recommended settings when using, for example, the HLS/HTTP Live Streaming protocol results in more than 20 seconds of latency from glass to glass (i.e. camera-to-viewer), not including any network latencies. Additional information may also be found in the following link: "https://developer.apple.com/documentation/http_live_streaming/his_authoring_specification_for_apple_devices."

FIG. 1 is a schematic exemplary illustration of HLS (HTTP Live Streaming) according to known art. As "AV input," a camera 200 records images of a motive 201 and provides frames 210 to a server 220. The server encodes frames into segments of target durations. The server 220 encodes and distributes segments of frames. The encoder 221 can generate content, for example in H.264/AVC or HEVC and can adhere to the standards specified according to HLS specifications, and thus the encoder 221 converts analog or digital video to another digital video format for delivery to a decoder. A packaging function compiles frames into segments 211 of short durations, e.g. 10 seconds long and provides to a distributer 222. An XML file called a playlist may be created that contains the names, location, and sequence of playback of the segments (along with metadata that describes the codec, resolution, bitrates, etc.). The segments are then transmitted to a client 230, which buffers the segments and encodes them. The segments are buffered in a buffer 231, and decoded by a decoder 232 The decoded frames 210 are then provides to a display 240 of a user (or client).

According to the HLS specification: the target duration may take minimum 6 seconds and the target segments are minimum 3. This results in glass-to-glass latency of: 6 seconds encoding+(3×6 seconds buffering)=minimum 24 seconds latency.

Furthermore, this also implies that individual frames in a video stream cannot easily be accessed, as the last received key-frame and all information since that must be considered.

In this way, there are limitations on how the user may manipulate and/or control the image content of the video stream, e.g. the user may be allowed to fast forward and step forward frame-by-frame in the video stream with relative ease but not play or step backwards or make larger jumps forwards and backwards.

Purely by way of example, if a player scores a goal during a football game, it is envisaged that a user of an application, which is streaming the football game, would want to rewind to the time point when the player first contacts the ball and prepares to shoot for goal. With today's audio/streaming services, this requires first finding the latest previous key-frame (the start of the particular segment), download the segment, and then stepping forward frame by frame until the desired moment, which puts limits on the speed of access and the user experience. If streams from multiple camera angles are offered, each time the user selects a different camera stream, the same delay is present before showing the image on screen. Put differently, since the video stream is made up of moving picture sequences, where several images have been fused into a segment, information on an individual image is dependent on the whole segment, which puts restrictions on speed of operation and how the user can access and navigate between individual images.

In yet another example, a user may attend a live event and wants to stream the event while simultaneously watching it. For instance, a user attending a Formula 1 race may wish to see camera streams from the other side of the track or the pit stop on a mobile device. Even a very small delay in the video feed means a mismatch between the real world and what is seen on the device. To complicate matters further, any real-time (very low latency) data shown in an application, such as the position of the cars on a track map, would need to be either synchronized with the video feed and thus be delayed, or shown in real-time and thus be off synch with what is happening in the video streams. From a user point of view, when e.g. watching a sports game, as described above, or any other event where it is of interest to view video in "real-time" or review occurrences in the past and/or from multiple viewing angles, there is envisaged an increased need for lower latencies, immediate control of the image content in real time, and synchronization of data and video, which puts new demands on how to deliver moving pictures in real time.

SUMMARY

Thus, there is a need for an improved technology, system and method for providing image content in real time, which can be bundled with other data sources to enhance the user experience while utilizing the available bandwidth of the system in an effective manner.

For these reasons and additional advantages described in the following detailed description, a system is provided for processing images. The system comprising: at least one image recorder adapted to: record a series of images, generate a set of image data for each image in the series of the recorded images, a first control unit configured to: modify each set of image data and generate a first type of image frame by providing each set of image data with an identity of the image recorder and a timestamp, and sequentially transmit each first type of image frame, at least one second control unit configured to: receive the first type of image frame, process each first type of image frame and generate a second type of image frame by modifying each first type of image frame, and transmit to a user and/or store each second type of image frames. In one embodiment, the second type of image frame is a data compressed set of image data. The system may further comprise a data storing arrangement connected to a second control unit for storing first or the second type of image frames. The system may further comprise a user terminal configured to decode the second type of the image frame into first type of the image frame and display the recorded image. The user terminal may comprise one or several view fields, each view field displaying different views of an event or motive corresponding to recorded images in real time, and at least each view field allows parallel real time manipulation of the views. In one embodiment, the user terminal communicates with the storing arrangement to retrieve the second type of image frames by providing one or several timestamps and image recorder identities. The system may further comprise a third control unit communicating with the user terminal and the storing arrangement, the third control unit being configured to receive requests from the user terminal comprising one or several timestamps and image recorder identities, retrieving corresponding second type of image frames and providing retrieved second set of image frames to the user terminal. In one embodiment, the image recorder comprises the first control unit. According to one embodiment, the latency of the system from recording an image and providing the image to the user terminal is between 0.1 seconds to 1 second, and preferably less than 0.5 seconds. According to another embodiment, a latency of the system from recording an image, storing the image frames in the storing arrangement and providing the image frames to the user terminal is between 0.1 seconds to 1 second, and preferably less than 0.5 seconds. In one embodiment, the system may comprise a fourth control unit for providing the system with additional metadata to be added to the second set of the image frame, the metadata comprising one or several of geo information, GPS data, information about the visual content, such as headline, caption, keywords, persons, locations, companies, artwork or products shown in the image, identification of the creator, copyright information, credits and underlying rights in the visual content including model, property rights, rights usage terms and other data for licensing the use of the image, creation date and location, instructions for the users, job identifiers, and other details. In one embodiment, at least two of the first, second, third and fourth control units are integrated in one control unit. In one embodiment, each first type of image frame is sequentially transmitting in a chronological order.

The invention also relates to a computer unit comprising a control unit comprising a processor, a memory, a storage device, an input device, an output device, and a communication interface for use in system as described.

The invention also relates to a storing arrangement for use in a system according to foregoing description.

The invention also relates to an image recorder at least comprising a processor, a memory, a storage device, an input device, an optical sensor, and a communication interface for use in system according to above description.

The invention also relates to a method for processing images, the method comprising: recording a series of images using at least one image recorder, generating a set of image data for each image in the series of recorded images, modifying each set of image data and generating a first type of image frame by providing each set pf image data with an identity of the image recorder and a timestamp, transmitting each first type of image frame, processing each first type of image frame and generating a second type of image frame by processing each first type of image frame, and transmitting to a user terminal and/or storing each second type of the image frames. In one embodiment, first type of image frame is a data compressed set of image data. The method may further comprise storing first or the second type of image frames in a data storing arrangement connected to a second control unit. In one embodiment, the method comprises decoding by a user terminal the second type of the image frame into first type of the image frame and displaying the recorded image. In one embodiment, the method comprises retrieving by the user terminal from the storing arrangement the second type of image frames by providing one or several of timestamps and image recorder identities. In one embodiment, the method further comprising the user terminal communicating with a third control unit the storing arrangement, the third control unit being configured to receive requests from the user terminal comprising one or several timestamps and image recorder identities, retrieving corresponding second type of image frames and forwarding retrieved second set of image frames to the user terminal. The method may comprise sequentially transmitting each first type of image frame in chronological order.

The invention also relates to a computer-implemented method of providing a user with an image content within a computer system comprising a user terminal, a provider server, at least one image recorder and an optional database, which are connected via a communication network. The method comprising: recording a series of images using at least one image recorder, generating a set of image data for each image in the series of recorded images, modifying each set of image data and generating a first type of image frame by providing each set pf image data with an identity of the image recorder and a timestamp, transmitting each first type of image frame, processing each first type of image frame and generating a second type of image frame by processing each first type of image frame, and transmitting to a user terminal and/or storing each second type of the image frames.

BRIEF DESCRIPTION OF THE DRAWINGS

Reference is made to the attached drawings, wherein elements having the same reference number designation may represent like elements throughout.

DETAILED DESCRIPTION

Figure 1:
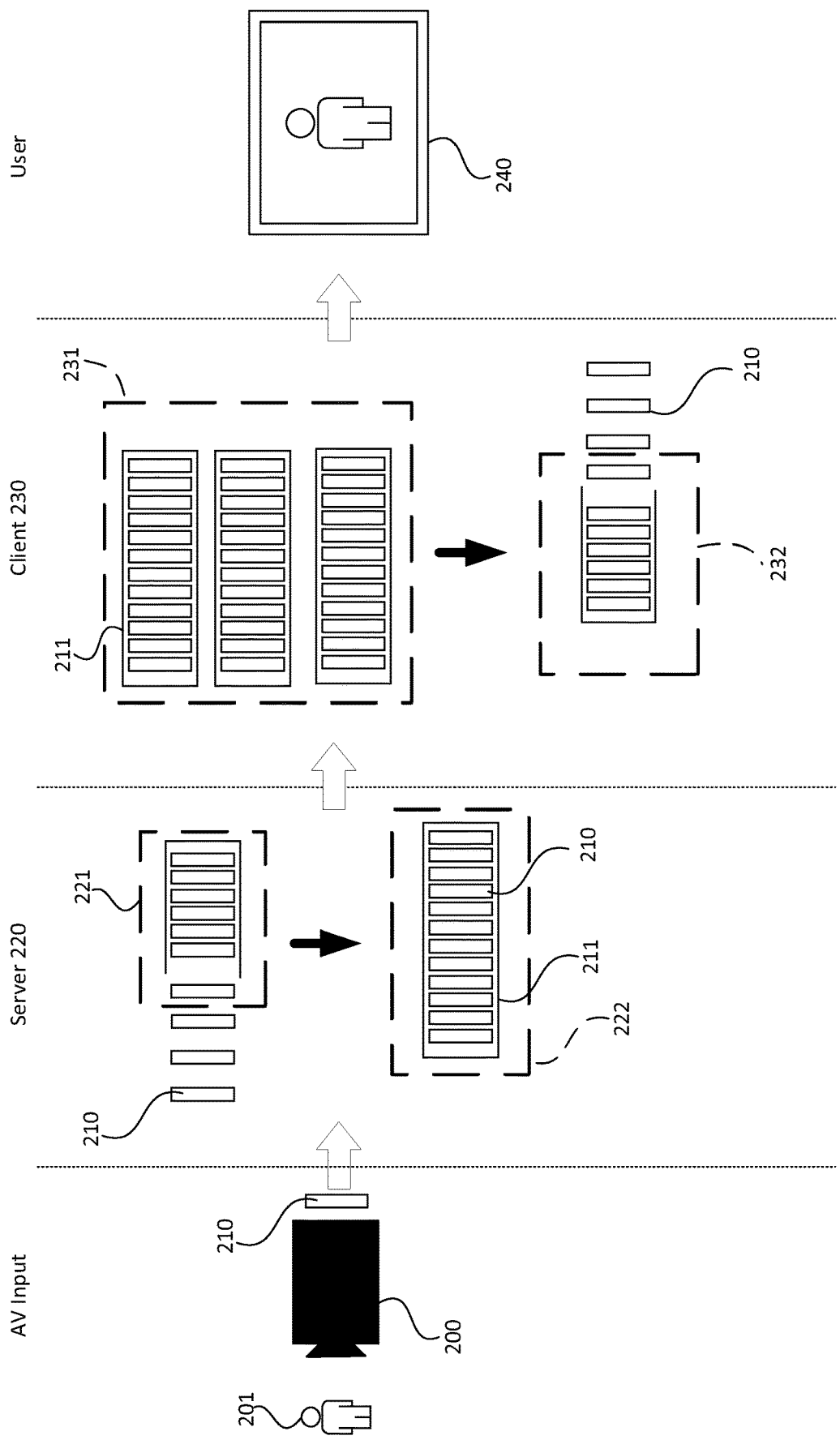
FIG. 1 is a diagram of a system according to known art.

The following detailed description does not limit the invention. Instead, the scope of the invention is defined by the appended claims.

The term "image" as used herein, may refer to a digital representation of visible or invisible information (e.g., a picture, a video, a photograph, animations, etc.).

The term "image frame" as used herein, may refer to a portion in a series of sequential images, i.e. each image in a number of images recorded during a limited time period, e.g. 60 frames during one second. The term "frame" as used herein may refer to each individual image in series of images received from a camera.

The term "real-time" as used herein, may refer to a response that is in the order of a specific time frame of less than one second.

The term "image recorder" as used herein, may refer to an electronic imaging apparatus, i.e. a camera, having an information-recording medium for "capturing" scene images and converting image data to electrical signals. In the following, the output of the sensor will be referred to as "image data".

The term "visual information" as used herein, may refer to an information, which at some point is visualised for a user. It may also be captured within the invisible spectrum and formatted to be visual.

Shortly, the present invention concerns providing ability to collect image information using a number of cameras (image recorders), convert to data, arrange the image data in a quickly accessible manner by a user (client) or service provider, adding additional metadata to the image data, and upon request providing the image data to a user/service provider converted to image information, and allowing the user to control events of the image information, all within a very short timeframe, preferably in less than 0.5 seconds from camera-to-user ("glass-to-glass").

In the following, exemplary general systems according to the present invention will be described. The system or portions of it may have different functionalities; in the following, one functionality is referred to as the "live" functionality and to be used to deliver the data stream to requesting client devices for immediate display of real-time footage, i.e. "live". With the live functionality, the time it takes (latency) for an single image frame to be captured from the recording device, processed in accordance to the above, and shown on the client device ("glass to glass") is preferably less than 0.5 seconds, including regular WiFi latency of 2-10 ms. The time it takes from when a client/user requests an image (or rather a continuous stream of individual images) from an image recording device to when the first image is shown on the screen is preferably between 0.1 second to 1 second and most preferably less than 0.5 seconds, including handling of the user request and regular, e.g. WiFi latency of 2-10 ms. The number of concurrent clients watching the image streams preferably does not affect the system load and can serve a virtually infinite number of clients (although the available network bandwidth will put a limit on number of simultaneous clients).

Parallel with the "live functionality", the system may perform the same tasks while also storing all individual frames and their respective metadata (in the following called enhanced frame or e-frame) stream in a storing device. This function is referred to as the "store" functionality and is used to store all e-frames for later retrieval when clients/users request to play back, rewind to previously recorded frames or in any way traverse through the frames.

One or more additional functionalities may also be provided. An additional function is the "serve" functionality and is connected to the storing device of the "store" functionality. The "serve" functionality handles client/user requests, e.g. for playing back or rewinding to previously recorded e-frames by fetching data from the storing system by the client applications implicitly specifying the identity information of the frame/frames according to the user input. With the serve functionality, the time it takes from when a client requests an image (or continuous stream of individual images) from storage to when the first image is shown on screen is preferably between 0.1 second to 1 second and most preferably less than 0.5 seconds, including handling of the user request and regular WiFi latency of 2-10 milliseconds. As it is implied, that different clients will request different temporal data at different times each request is handled individually, meaning there is a limit on number of concurrent client requests. This number may be scaled up by increasing the number of store and serve systems units.

Figure 2:
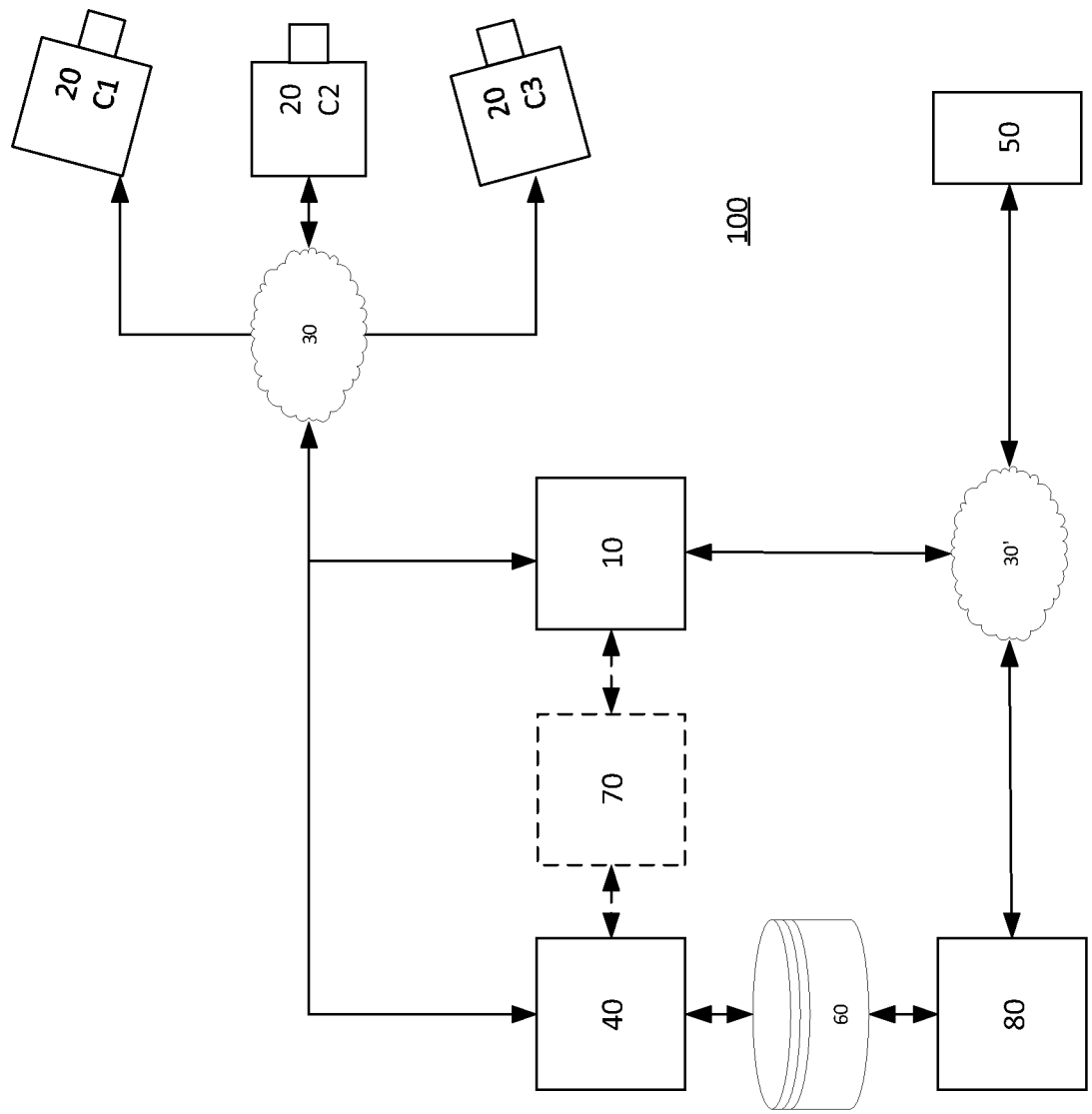
FIG. 2 is a diagram of an exemplary system in which methods and systems described herein may be implemented.

FIG. 2 is a diagram of an exemplary system 100 in which methods of the invention described herein may be implemented. The system according to a basic exemplary embodiment of the invention may include server 10, one or several image recorders or cameras 20, C1-C3, and a user terminal (client) 50.

The system according to a second exemplary embodiment may include a second server 40 in communication with a storing arrangement 60.

In a third exemplary embodiment of the system 100, a second server 80 may be implemented in communication with and configured to read data from storing arrangement 60.

The storing arrangement 60 may comprise any of hard drive, solid-state drive, or any other computer storage able of storing large amounts of data.

Each cameras 20 (C1-C3), may communicate directly or through a network 30 with the servers 10 and 40. Each camera may comprise a commercially available image recorder for recording images. Preferably, each image recorder records images of an object 90 or even with speed of at least 30 image frames per second.

Each camera 20 comprises a processing unit 21 (FIG. 3), which may control the operations of the camera and provide each individual image frame with camera identity information (camera ID) and/or a time stamp.

Preferably, the invention may use cameras that can generate individual image frames very fast (rate of milliseconds) and allow programming the camera to apply each frame with, e.g. camera ID and/or time stamp. The cameras may be arranged to record images (of same event or motive)

in different angles, distances, qualities, colours, frame rates, etc. The cameras may export image data in an arbitrary image format, e.g. RAW, JPEG, or TIFF (preferably not a video format). The cameras may operate within visible and/or invisible light spectrum, for example, one of the cameras may be a thermal camera and one IR or UV camera or any combination thereof. A camera may also be part of a cell phone, a smartphone, a computer, tablet, etc.

In one embodiment, the image recorders may record and store images directly on the storing arrangement 60 or an additional storage device (not shown).

The servers 10 and 40 may communicate with one or more external computers/servers 70, e.g. for receiving additional data to be included in the image frames. Such data may include geo information, GPS data, information about the visual content, such as headline, caption, keywords, persons, locations, companies, artwork or products shown in the image, identification of the creator, copyright information, credits and underlying rights in the visual content including model, property rights, rights usage terms and other data for licensing the use of the image, creation date and location, instructions for the users, job identifiers, and other details. Portions of metadata may also be applied by the camera or servers 10, or 40.

The user terminal 50 may communicate directly or through a network 30' with the servers 10 and 80. The user terminal may comprise a computer (PC), a mobile terminal such as a cell phone or smartphone, an Ipad®, tablet, etc. The user terminal may be configured to execute a system specific application (app) to access image content and image data (frames) from the server(s), which will be described in more detail later.

Figure 3:
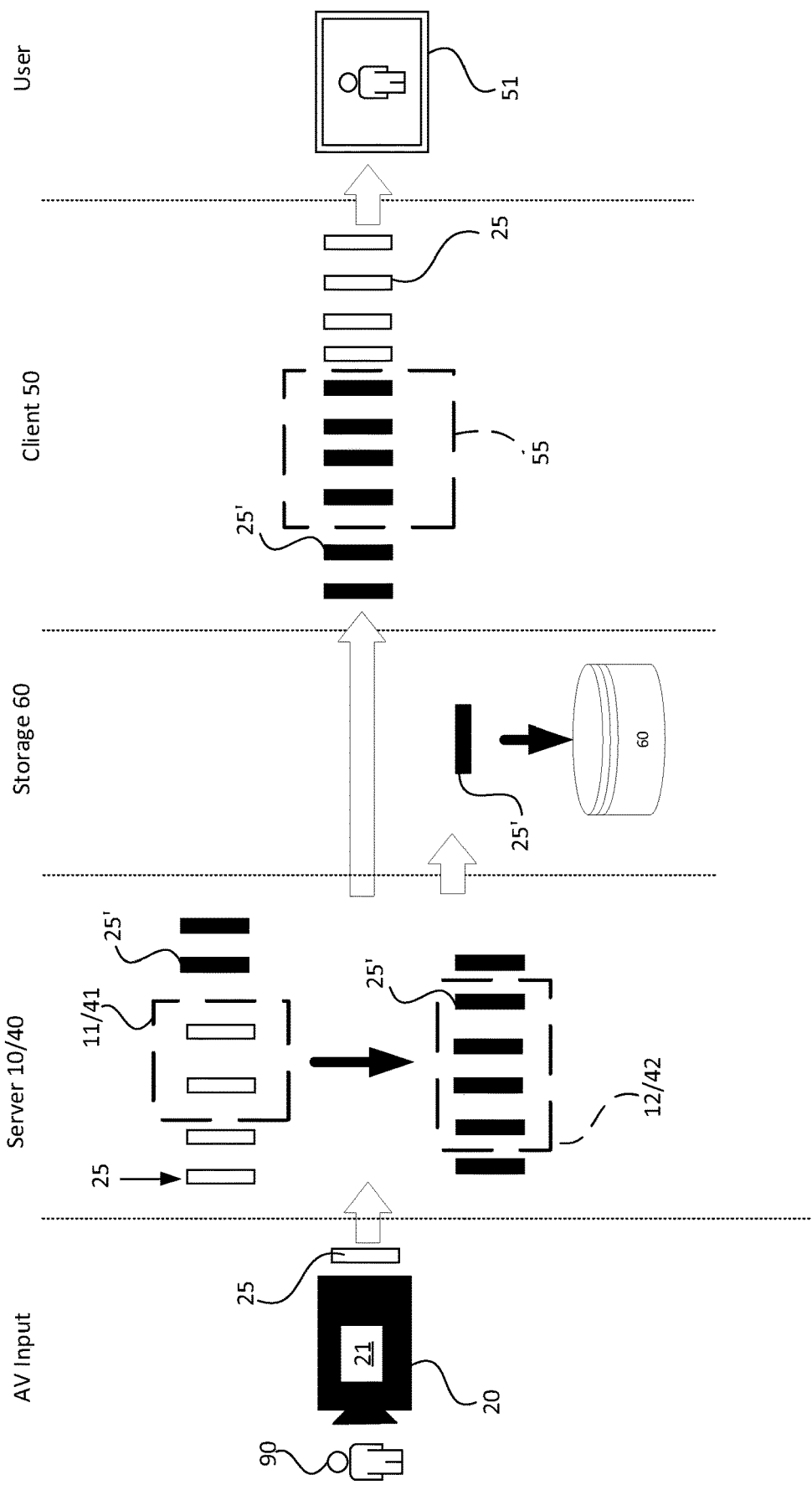
FIG. 3 is a diagram of an exemplary system according to the present invention.

With reference to FIG. 3 and in conjunction with FIG. 2, the camera 20 records images of the motive 90. Each image frame 25 is processed with the processing unit 21 of the camera and provided with camera ID and/or a timestamp, and then transferred to server 10 (and optionally server 40). Each frame may be encoded using a suitable codec by means of an encoder 11/41 and/or provided with additional metadata. As it is only frames that are used, each frame may only be compressed, using e.g. jpg, gif, png, lzw, rle, etc. The encoded frames 25' (in the following called "e-frames") are distributed by a distributer 12 via a network to a client 50. Via server 40 and its distributer 42, these may be transferred to the storing arrangement 60 and stored for succeeding retrieval by the user. The client or terminal 50 comprises a decoder 55, which decodes the e-frames 25' to decoded frames 25 and displays the recoded image of the motive 90 on, for example through a display 51 to a user. In one configuration, the servers 10 and 40 operate (substantially) in parallel and receive the individual image frames from each camera. Both servers 10 and 40 may be connected to an external server 70 to receive additional data.

In one embodiment, only the frames 25 may be stored in the storing arrangement 60 and converted to (and compressed) frames 25' when requested by the user or retrieved by the server 80.

In the basic exemplary embodiment, the server 10 may be configured to prepare the individual frames by appending external data and immediately send the individual frames (e-frames 25') to the user terminal (client) 50.

In the second exemplary embodiment, the server 40 may be configured to prepare the individual frames by appending external data and immediately save the individual frames (e-frames 25') to storing device 60.

Figure 4:
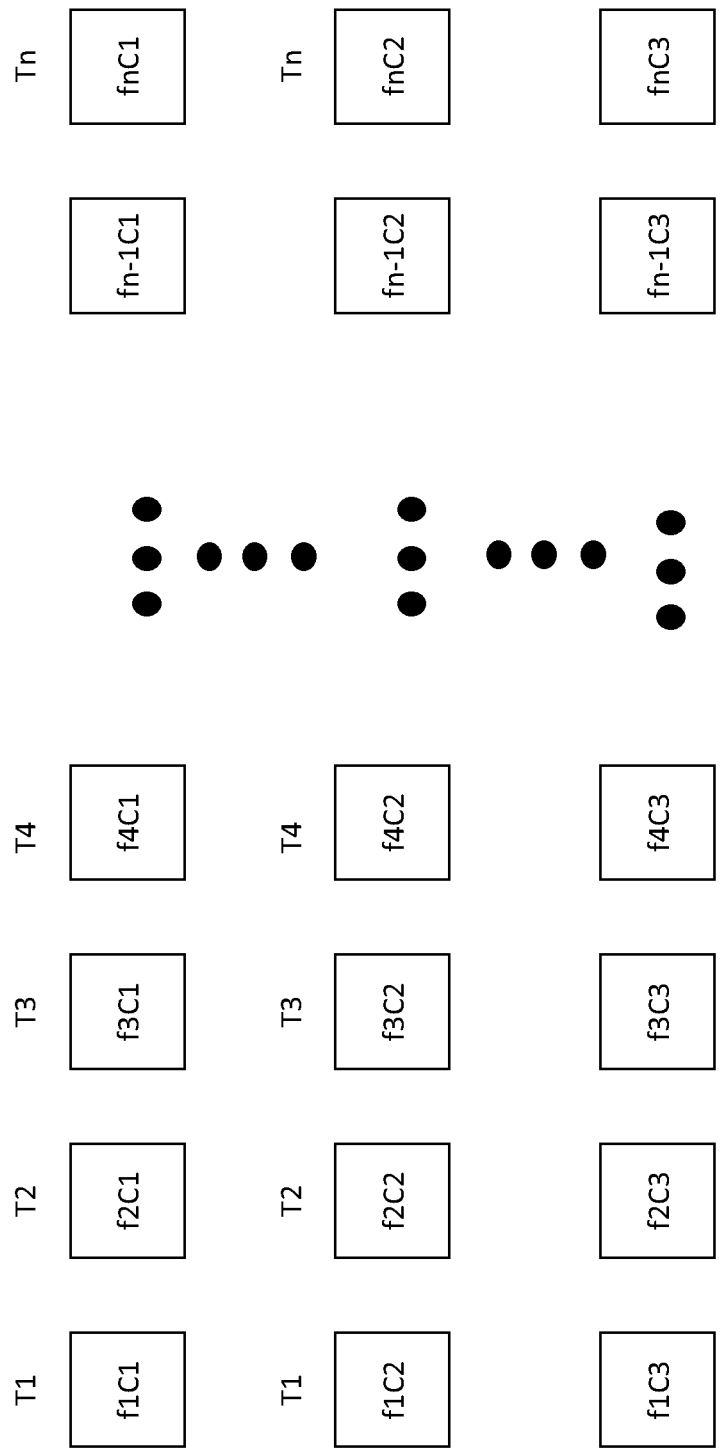
FIG. 4 illustrates schematically image frames produced in accordance with one exemplary method of the present invention.

FIG. 4 illustrates streams of image frame from cameras C1-C3 in FIG. 2. Each frame is provided with a label or id comprising a camera number or identity C, a time stamp T and optionally they may be provided with a frame number f. Consequently frame C1;T1;f1 means frame number of 1 at time 1 from camera number 1. Of course, the time stamp T1 is simplified and information may comprise date, hours, minutes, seconds and fractions of seconds (including but not limited to e.g. milliseconds). The ids or appended data may also comprise additional information, such as geolocation or GPS information or any other metadata that is relevant for the application from cameras or external server 70.

Figure 5:
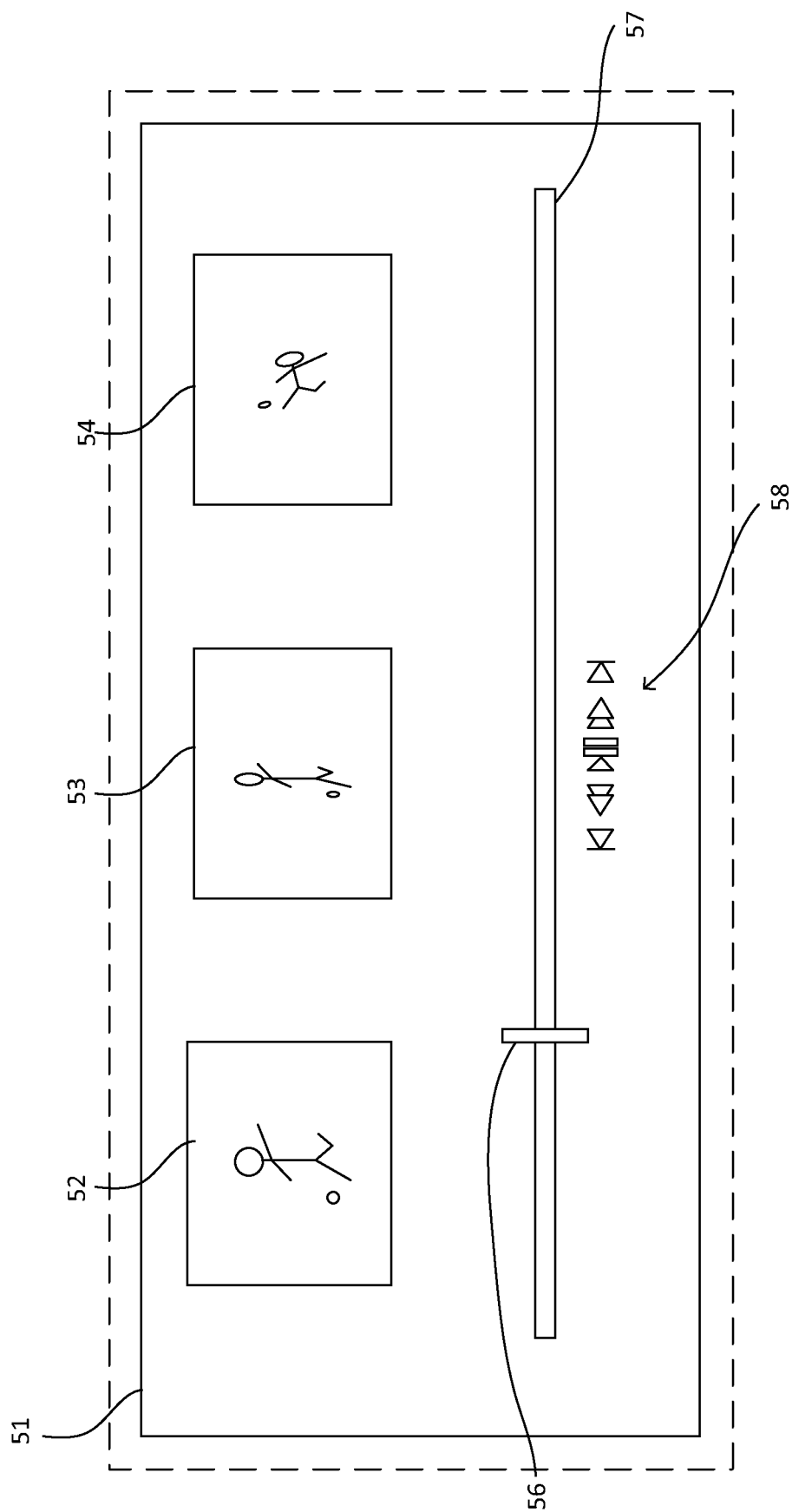
FIG. 5 illustrates a schematic view of a user interface in a user device according to one embodiment of the invention.

FIG. 5 illustrates schematically a very simplified screen or a "window" 51 of the user terminal 50. The GUI according to this embodiment comprises three (motion picture) fields 52, 53 and 54 linked to images from each camera 20 C1-C3. Each field displays the recorded object 90 (FIG. 2) from different angles/distances/views. Clearly, the GUI may comprise only one or more than three fields. The GUI may also comprise a virtual (timeline) slider 57 having a slider controller 56, or (virtual) control buttons 58. The timeline slider window provides controls that allow the user to visualize temporal images. The user can invoke the time slider window by calling a time slider function. The time slider window may provide controls that allow the user play, forward or rewind the motion pictures on the screens 52-54. Each screen 52-54 may also have a corresponding slider or control buttons. When the user watches image content (a motion picture or individual images) in real time, the client receives images and metadata from server 10. When the user starts to request previous frames that are not "live" or real time (e.g. by moving the time slider in opposite direction of play), the client instead seamlessly shifts to request images and metadata from the server 80, which is connected to the storing arrangement 60; the server 80 searches the stored frames in storing arrangement 60 for timestamps corresponding to the time information received from the terminal, i.e. a time indication mapped to the time scale of the slider and provides the frames with the corresponding timestamp, camera and metadata to the terminal. The time it takes from when a user requests an image (or a continuous stream of individual images) from the server 10 or 80 to when the first image is shown on the screen is preferably between 0.01 second to 1 second and most preferably less than 0.5 seconds, including handling of the user request and regular network (e.g. WiFi) latency of 2-10 ms.

The method of appending external data to individual image frames allows for basically any data to be included but is especially effective for data which requires temporal synchronization such as tracking data, biometric data, real-time analytics, statistics etc. This data may be shown and replayed together with the image frames at the client device by using the client application timeline. Examples of data that is explicitly linked to the client application timeline system itself include "bookmarks"—markers in the timeline denoting specific events such as goals, penalty shots etc.—and "sequences"—bars in the timeline indicating periods, quarters etc. the server 80 may also alter data in storing arrangement 60 by adding for example bookmarks, favorites, etc.

Due to the very low latency and ability to "jump" between the individual frames with respect to timestamp (or frame number) enquiry from the users, additional functions (not illustrated) may be available:

Play to play a time animation, which steps through the motion pictures and their metadata sequentially. The user may pause the time animation at any point by clicking a pause button.

Options to play back a sequence in true slow motion, i.e. ½ speed or ¼ speed at 30 image frames per second, if the sequence has been captured at 60 or 120 image frames per second respectively.

Click and drag the time slider control 56 to the right or left to step through individual image frames on the screens interactively.

A next frame button to step forward to the next frame.

A previous frame button to step back to the previous frame.

Toggling between displaying images based on the time constraints set using the time slider control and displaying all the images without any time constraints.

Options to set the time slider properties.

Decrease time extent to shorten the time extent of the time slider to focus on a shorter period of time.

Increase time extent to lengthen the time extent of the time slider to focus on a longer period of time.

View image metadata for each individual frame such as GPS, biometrics, tracking, analytics and statistics in various visualization modes including but not limited to plotting data on 2D or 3D maps, information overlaid on images, data in panels or lists etc.

Jumping between bookmarks in the timeline denoting important events such as goals, penalty shots etc.

Jumping between sequences in the timeline indicating periods, quarters etc.

Figure 6:
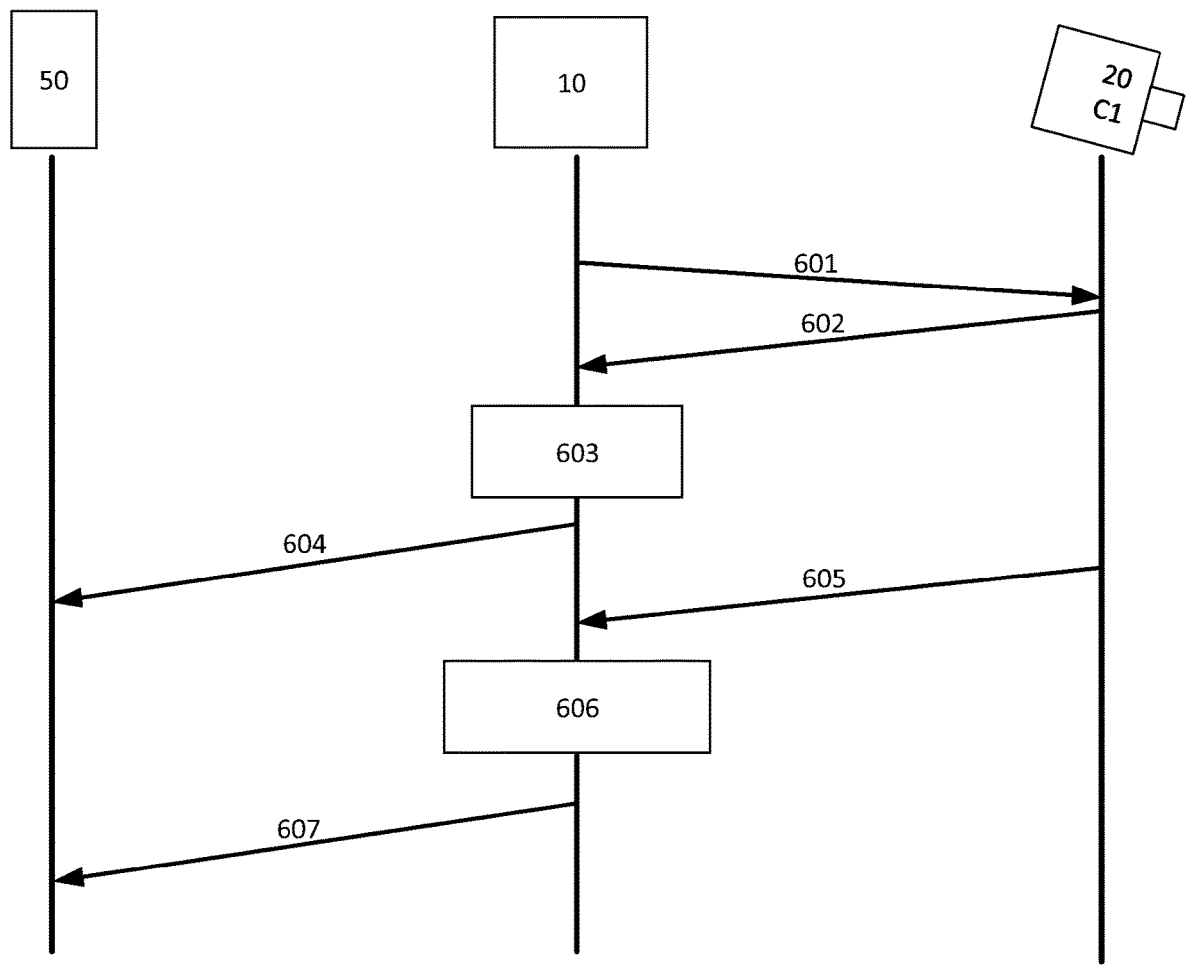
FIG. 6 is a flow diagram illustrating a portion of exemplary processing by the system of FIG. 2.

The time flow diagram of FIG. 6 shows exemplary steps of the invention in conjunction with system of FIG. 2 for "live" functionality when streaming an event:

601: server 10 requests image frames from the camera 20 (one or several); the image frames are sent automatically (push functionality);

602: camera 20 transmits image frames (after modification) to server 10;

603: server 10 processes each image frame and combines with collected metadata into an e-frame 25';

604: server 10 broadcasts e-frame 25' to any broadcast listener user terminals 50;

605: camera 20 transmits an image frame to server 10;

606: server 10 processes image frame and combines with collected metadata into an e-frame 25';

607: server 10 broadcasts e-frame to any broadcast listener user terminals 50;

The process continues until the app is terminated. It should be understood that above steps are executed in real-time and substantially in parallel, i.e. a user obtains stream of frames (or at least one frame) while the server receives and processes image frames from the cameras.

It should also be noted that several users can access the different image frame streams at any time and control the streams/frames as exemplified earlier in substantially real-time, i.e. less than 0.5 seconds (some milliseconds to 1 second generally, preferably less than 0.5 seconds).

Figure 7:
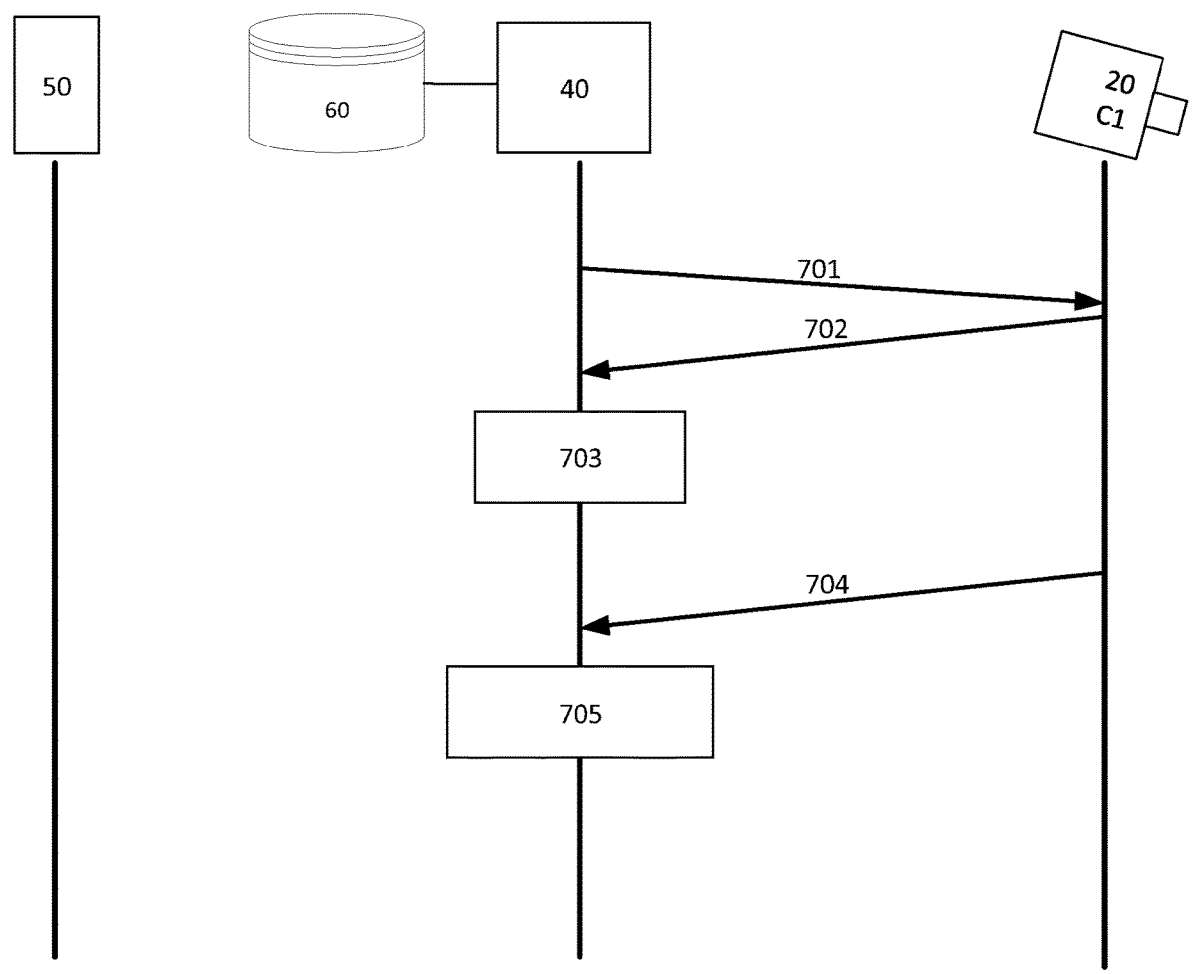
FIG. 7 is a flow diagram illustrating another portion of exemplary processing by the system of FIG. 2.

The time flow diagram of FIG. 7 shows exemplary steps of the invention in conjunction with system of FIG. 2 for "storing" functionality:

701: server 40 requests image frames from the camera 20; the image frames may be sent automatically (push functionality);

702: camera 20 transmits image frame to server 40;

703: server 40 processes image frame and combines metadata into an e-frame 25' and stores the result in storing arrangement 60;

704: cameras 20 transmits image frame to server 40;

705: server 40 processes image frame and combines metadata into an e-frame 25' and stores the result in storing arrangement 60.

Figure 8:
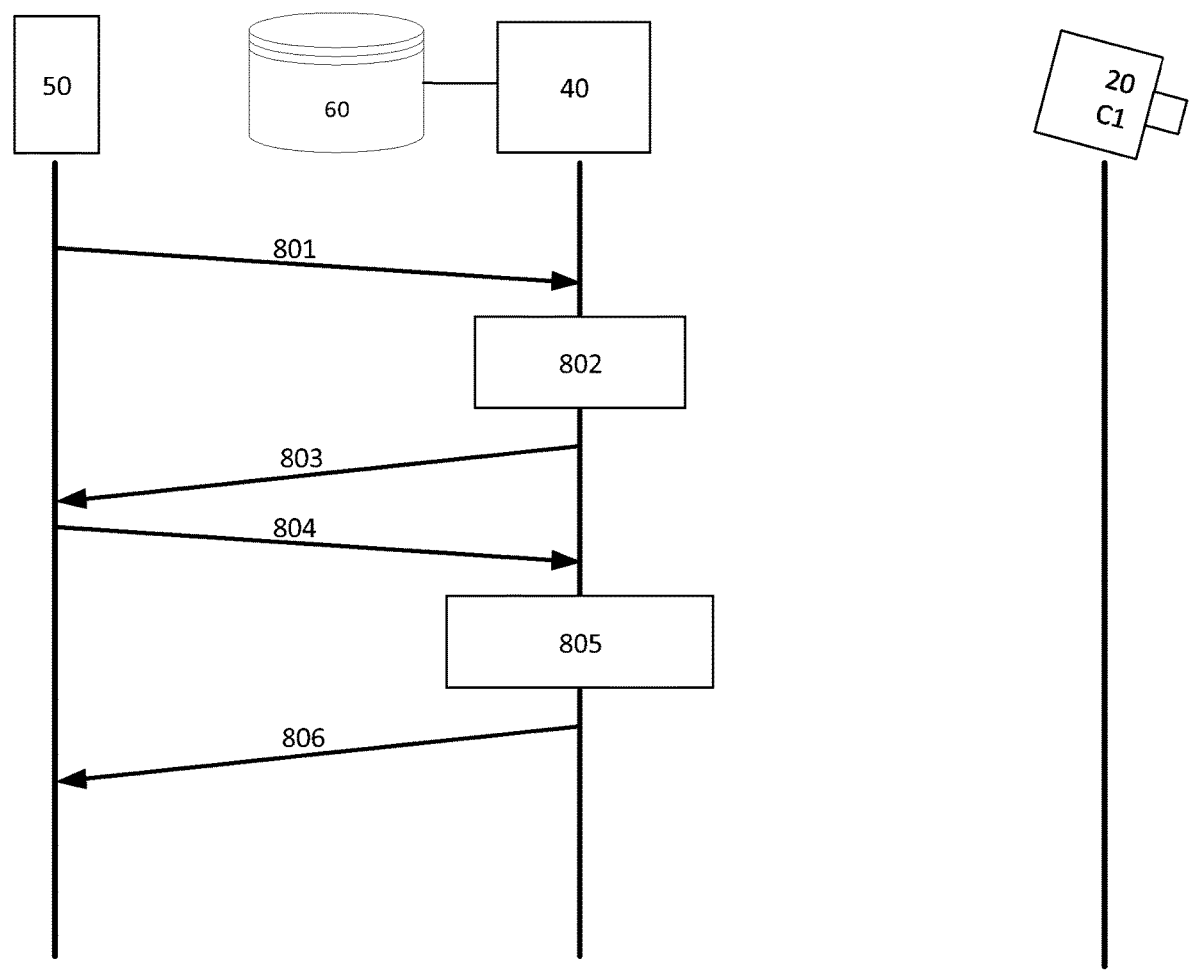
FIG. 8 is a flow diagram illustrating yet another portion of exemplary processing by the system of FIG. 2.

Storing of each image frame in the storing device may be in an arbitrary but application specific hierarchy, an API in the processing unit to access/fetch any image frame/frames in real-time by specifying the identity information of said frame/frames The time flow diagram of FIG. 8 shows exemplary steps of the invention in conjunction with system of FIG. 2 for "serv" functionality, i.e. retrieval of image by the user:

801: user terminal 50 requests a specific e-frame 25' from server 80;

802: server 80 fetches the requested e-frame 25' from storing arrangement 60;

803: server 80 transmits the requested e-frame 25' to user terminal 50;

804: user terminal 50 requests a specific e-frame 25' from server 80;

805: server 80 fetches the requested e-frame 25' from storing arrangement 60;

806: server 80 transmits the requested e-frame 25' to user terminal 50.

Obviously, the functions of servers 10, 40, 70 and 80, in an alternative embodiment(s), may be implemented in only one server or computer. One or several servers may consist of a control unit. Each server or all servers may be part of a camera unit or a camera may be a part of a server.

Figure 9:
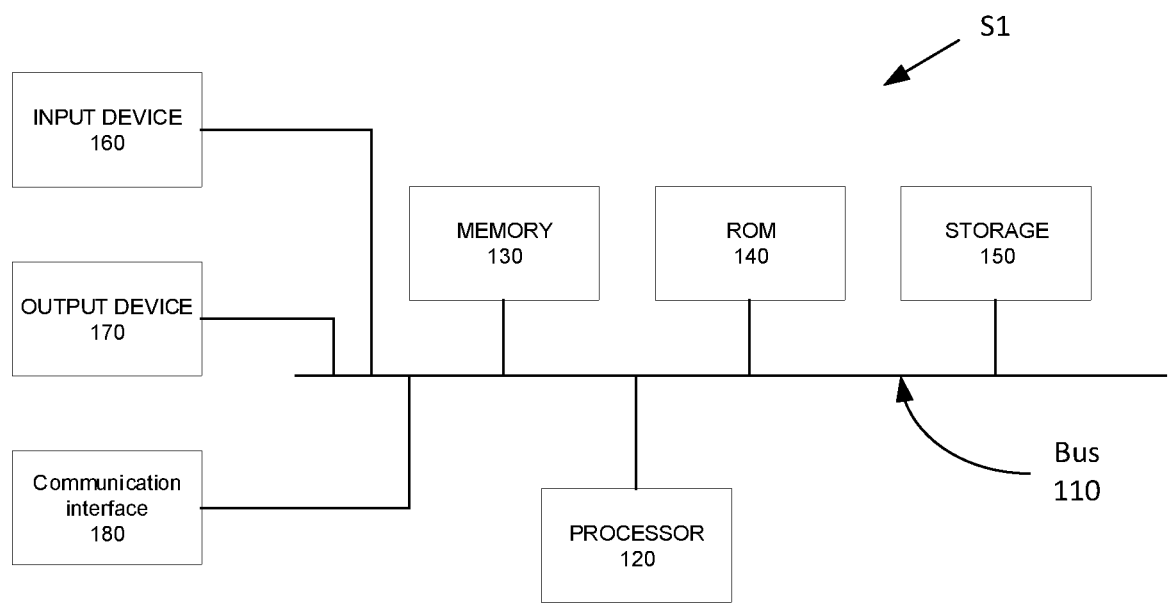
FIG. 9 illustrates schematically a controller according to one embodiment of the present invention.

FIG. 9 is a diagram of an exemplary server S1 in which parts of methods described herein may be implemented. The server S1 may include a bus 110, a processor 120, a memory 130, a read only memory (ROM) 140, a storage device 150, an input device 160, an output device 170, and a communication interface 180. Bus 110 permits communication among the components of server S1. The server S1 may also include one or more power supplies (not shown). One skilled in the art would recognize that the system S1 may be configured in a number of other ways and may include alternative or different elements.

Processor 120 may include any type of processor or microprocessor that interprets and executes instructions. Processor 120 may also include logic that is able to decode media files, such as audio files, video files, multimedia files, image files, video games, etc., and generate output to, for example, a speaker, a display, etc. Memory 130 may include a random-access memory (RAM) or another dynamic storage device that stores information and instructions for execution by processor 120. Memory 130 may also be used to store temporary variables or other intermediate information during execution of instructions by processor 120.

ROM 140 may include a conventional ROM device and/or another static storage device that stores static information and instructions for processor 120. Storage device 150 may include a magnetic disk or optical disk and its corresponding drive and/or some other type of magnetic or optical recording medium and its corresponding drive for storing information and instructions. Storage device 150 may also include a flash memory (e.g., an electrically erasable programmable read only memory (EEPROM)) device for storing information and instructions.

Input device 160 may include one or more conventional mechanisms that permit a user to input information to the server S1, such as a keyboard, a keypad, a directional pad, a mouse, a pen, voice recognition, a touch-screen and/or biometric mechanisms, etc.

Output device 170 may include one or more conventional mechanisms that output information to the user, including a display, a printer, one or more speakers, etc. Communication interface 180 may include any transceiver-like mechanism that enables the server S1 to communicate with other devices and/or systems. For example, communication interface 180 may include a modem or an Ethernet interface to a LAN. Alternatively, or additionally, communication interface 180 may include other mechanisms for communicating via a network, such as a wireless network. For example, communication interface may include a radio frequency (RF) transmitter and receiver and one or more antennas for transmitting and receiving RF data.

The server S1, consistent with the invention, provides a platform through which a user may access and/or view various media, such as music files, video files, image files, games, multimedia files, etc. The server S1 may also display information associated with the media played and/or viewed by a user in a graphical format, as described. According to an exemplary implementation, the server S1 may perform various processes in response to processor 120 executing sequences of instructions contained in memory 130. Such instructions may be read into memory 130 from another computer-readable medium, such as storage device 150, or from a separate device via communication interface 180. It should be understood that a computer-readable medium may include one or more memory devices or carrier waves. Execution of the sequences of instructions contained in memory 130 causes processor 120 to perform the acts that will be described hereafter. In alternative embodiments, hard-wired circuitry may be used in place of or in combination with software instructions to implement aspects consistent with the invention. Thus, the invention is not limited to any specific combination of hardware circuitry and software.

In case the server is server 10, in accordance with the earlier examples and with reference to FIGS. 2 and 8, the server S1 receives 202 image frames from the cameras 20 communicating through communication interface 180. The processor 120 processes the image frames (frame by frame) and encodes each frame. It may also provide them with additional information, i.e. metadata. A distributer functionality, distributes the frames through the interface 180 to communicating users.

In case the server is server 40, in accordance with the earlier examples and with reference to FIGS. 2 and 8, the server S1 receives 202 image frames from the cameras 20 communicating through communication interface 180. The processor 120 processes the image frames (frame by frame) and encodes each frame. It may also provide them with additional information, i.e. metadata. A distributer functionality, distributes the frames through the interface 180 to a storing arrangement 60. In additions, A user terminal may connect to the server through the communication interface 180 and ask for accessing the image streams arranged as stream of frames using a dedicated app. The server S1 receives instructions how to handle the frames from the user terminal. For example, a play instruction and a selected camera angle (e.g. camera C2) will feed a stream of frames from camera C2 to the terminal. The user may use the app to play forward or rewind the images. The app will then send instructions including time and camera to the server. The processor will process the request and the server will feed back the image frame(s) corresponding to the time and camera. All these in substantially real-time.

In case the server is server 80, in accordance with the earlier examples and with reference to FIGS. 2 and 8, the server S1 receives 202 instructions/requests from a user communicating through communication interface 180. The processor 120 processes the request/instruction and based on an instruction including e.g. frame timestamp and camera id, the server retrieves the frame from storing arrangement 60 in communication via interface 180 and provides the image to the user device.

Figure 10:
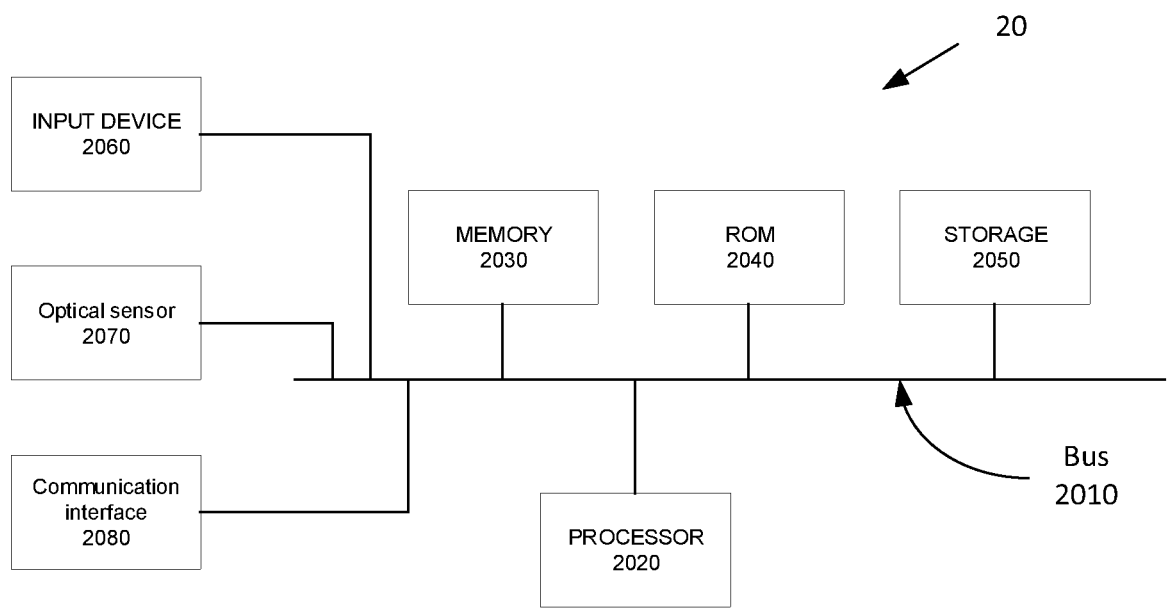
FIG. 10 illustrates schematically a camera according to one embodiment of the present invention.

FIG. 10 is a diagram of an exemplary camera 20 according to one embodiment of the invention. The camera 20 may include a data bus 2010, a processor 2020 (or control unit), a memory 2030, a read only memory (ROM) 2040, a storage device 2050, an input device 2060, an output device 2070, a communication interface 2080 and an image sensor 290. Bus 2010 permits communication among the components of the camera 20. The camera may also include one or more power supplies (not shown). One skilled in the art would recognize that the camera 20 may be configured in a number of other ways and may include alternative or different elements.

The processor 2020 may include any type of processor or microprocessor that interprets and executes instructions. Processor 2020 may also include logic that is able to encode and decode media files, such as audio files, video files, multimedia files, image files, video, etc., and generate output. Memory 2030 may include a random-access memory (RAM) or another dynamic storage device that stores information and instructions for execution by processor 2020. Memory 2030 may also be used to store temporary variables or other intermediate information during execution of instructions by processor 2020. The processor may also control the image sensor 290, read the output of the sensor when it is instructed to capture and image.

ROM 2040 may include a conventional ROM device and/or another static storage device that stores static information and instructions for processor 2020. Storage device 2050 may include any type of memory for storing information and instructions. Storage device 2050 may also include a flash memory (e.g., an electrically erasable programmable read only memory (EEPROM)) device for storing information and instructions.

Input device 2060 may include one or more conventional mechanisms that permit a user to input information and/or instructions to the camera 20, such as a keyboard, a keypad, a directional pad, a mouse, a pen, voice recognition, a touch-screen and/or biometric mechanisms, etc. Output device 2070 may include one or more conventional mechanisms that output information to the user, including a display, one or more speakers, etc. Communication interface 2080 may include any transceiver-like mechanism that enables the camera 20 to communicate with other devices and/or systems. For example, communication interface 2080 may include a modem or an Ethernet interface to a LAN, wireless communication. Alternatively, or additionally, communication interface 2080 may include other mechanisms for communicating via a network, such as a wireless network. For example, communication interface may include a radio frequency (RF) transmitter and receiver and one or more antennas for transmitting and receiving RF data.

The camera 20, consistent with the invention, provides a platform through which images are captured and provided further to the system of the invention. According to an exemplary implementation, the camera 20 may perform various processes in response to processor 2020 executing sequences of instructions contained in memory 2030. Such instructions may be read into memory 2030 from a computer-readable medium, such as storage device 2050, or from a separate device via communication interface 2080. It should be understood that a computer-readable medium may include one or more memory devices or carrier waves.

Execution of the sequences of instructions contained in memory 2030 causes processor 2020 to perform the acts such as recording images, generating image frames and providing each image frame with camera identity and a time stamp. In alternative embodiments, hard-wired circuitry may be used in place of or in combination with software instructions to implement aspects consistent with the invention. Thus, the camera is not limited to any specific combination of hardware circuitry and software.

Clearly, the camera comprises optical system (objectives, lenses, and filters), a housing, and the described electronics.

According to one embodiment, the parts of teachings of the invention may be applied to pre-recorded images and films. It is possible to process films from one or several image recorders, generate individual image frames, apply each image frame with a camera id, timestamp and optionally other metadata as described earlier and store the frames in the storing arrangement 60. Then a user terminal will be able to access the frames as described earlier.

Figure 11:
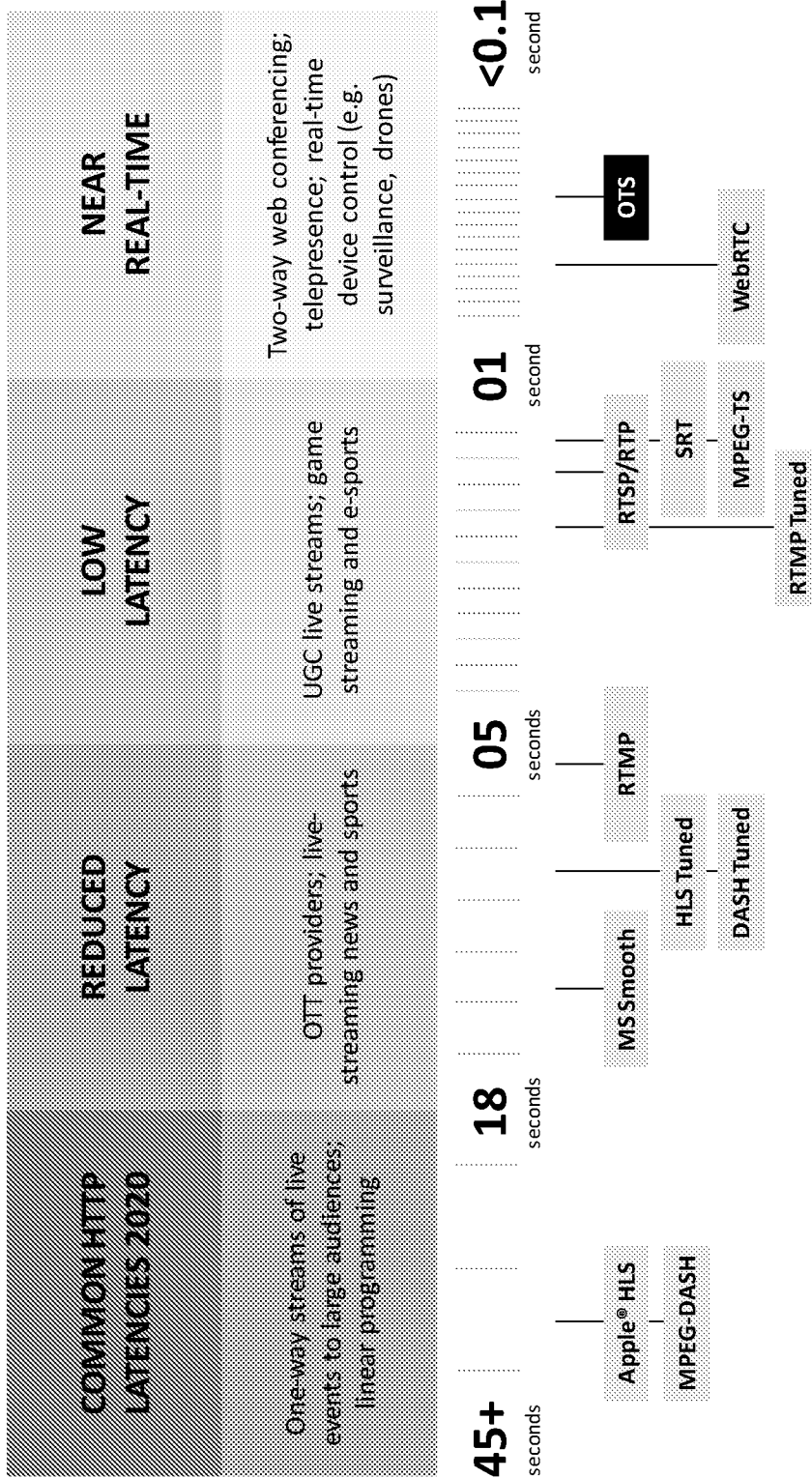
FIG. 11 illustrates latency compression between the present invention and prior art techniques.

FIG. 11 illustrates typical streaming latency and interactivity of the prior art techniques compared to the latency achieved by the present invention:

In the far left side, common HTTP latencies, for example for one-way streams of live events to large audiences and linear programming, using protocols such as APPLE HLS and MPEG DASH (Dynamic Adaptive Streaming over HTTP (DASH)) are illustrated with latency over 18 seconds (approx. 25 sec for APPLE HLS and MPEG DASH).

Moving to right side, OTT (Over The Top) media providers and live-streaming news and sports systems, e.g. using protocols such as MICROSOFT Smooth, HLS Tuned, DASH Tuned and RTMP (Real-Time Messaging Protocol), are illustrated with latencies between 5 seconds to 18 seconds.

Low latency, between 1 to 5 seconds may be achieved for UGC (User Generated Content) live streams, game streaming and e-sports, it is one way streaming, using RTSP/RTP, SRT, MPEG-TS, and RTMP Tuned.

At the far right, a very short latency meaning fast streaming is achieved for two-way web conferencing; telepresence; real-time device control (e.g. surveillance, drones), using WebRTC, about 0.8 seconds. However, these have no user interaction functionality.

The latency according to the present invention (indicated as OTS) is illustrated at the far right and about less than 0.5 seconds.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use. The features of the embodiments described herein may be combined in all possible combinations of methods, apparatus, modules, systems, and computer program products.

The invention claimed is:

1. A system for processing images, the system comprising:

at least two image recorders, each image recorder:
simultaneously records, from a respective direction of the image recorder that is different from the directions of the other image recorders, a series of images of an object that is located in a corresponding object position,
generates a set of image data for each image in the series of the recorded images,
comprising a first control unit that:
modifies each set of image data to generate a series of a first type of image frames by providing each set of image data with an identity of said image recorder and a timestamp, and
sequentially transmits each first type of image frame in chronological order, at least one second control unit that:
receives the series of first type of image frame from each of the image recorders,
processes each individual first type of image frame and generate a corresponding individual second type of image frame by modifying each individual first type of image frame, the modification comprising compression of the first type of image frame to produce a series of second type of image frames for each of the image recorders, and
for each series of second type of image frames, on an image frame by image frame basis, transmits the series of second type of image frames for reception by at least one user terminal and stores the series of second type of image frames, a user terminal comprising at least two viewing fields, the user terminal:

modifying each second type of image frame to a third type of image frame to produce a series of third type of image frames for each of the image recorders, associating each series of third type of image frames to a corresponding viewing field, and displaying each series of third type of image frames in the corresponding viewing field, and transmitting a request to obtain a previous image frame or a next image frame from each stored series of second type of image frames corresponding to a point in time in the recorded series of images of the object that has been selected by a user of the user terminal by simultaneously manipulating each of the viewing fields.

2. The system according to claim 1, further comprising a data storing arrangement connected to the second control unit for storing the first or the second type of image frames.

3. The system according to claim 1, wherein the user terminal decodes the second type of the image frames to produce the third type of image frames, the third type of image frames being the same as the first type of the image frames.

4. The system of claim 3, wherein the user terminal comprises a graphical user interface for the user to control the simultaneous manipulation of the viewing fields to select the point of time in the recorded series of images of the object in near real time with the displaying of the series of third type of image frames in the corresponding viewing fields for the selected point of time.

5. The system according to claim 3, wherein the user terminal is configured to communicate with the storing arrangement to retrieve said second type of image frames by providing one or more of timestamps, frame numbers, or image recorder identities.

6. The system according to claim 4, further comprising a third control unit communicating with the user terminal and the storing arrangement, the third control unit being configured to receive requests from the user terminal, the requests comprising one or more of timestamps, frame numbers, or image recorder identities, and to retrieve corresponding second type of image frames and provide the retrieved second set of image frames to the user terminal.

7. The system according to claim 1, wherein a latency of the system from recording an image and providing the image to the user terminal is between 0.1 seconds to 1 second.

8. The system according to claim 1, wherein a latency of the system from recording an image, storing the image frames in the storing arrangement and providing the image frames to the user terminal is between 0.1 seconds to 1 second.

9. The system according claim 1, comprising a fourth control unit configured to provide the system with additional metadata to be added to the second type of image frames, the metadata comprising one or more of: geo information; GPS data; or information about visual content, comprising one or more of headline, caption, keywords, persons, locations, companies, artwork or products shown in the image, identification of the creator, copyright information, credits, underlying content rights, rights usage terms, licensing data, creation date, creation location, instructions for the user, or job identifiers.

10. The system according to claim 9, wherein at least two of the first, second, third, and fourth control units are integrated in one control unit.

11. A method for processing images, the method comprising:

simultaneously recording a series of images of an object that is located in a corresponding object position with each of at least two image recorders from a respective direction of the image recorder that is different from the directions of the other image recorders, generating a set of image data for each individual image in the series of recorded images from each image recorder, modifying by a controller of each image recorder, each set of image data to generate a series of a first type of image frames by providing each set pf image data with an identity of the image recorder and a timestamp, transmitting the frames of each series of the first type of image frames sequentially in chronological order, for each series of the first type of image frames processing each individual first type of image frame and generating a corresponding individual second type of image frame by modifying each first type of image frame by compressing each first type of image frame to produce a series of second type of image frames for each of the image recorders, for each series of second type of image frames for each of the image recorders, on an image frame by image frame basis, transmitting the series of second type of image frames for reception by at least one user terminal and storing the series of second type of image frames, at a user terminal comprising at least two viewing fields;

modifying each second type of image frame to a third type of image frame to produce a series of third type of image frames for each of the image recorders, associating each series of third type of image frames to a corresponding viewing field, and displaying each series of third type of image frames in the corresponding viewing field, and transmitting a request to obtain a previous image frame or a next image frame from each stored series of second type of image frames corresponding to a point in time in the recorded series of images of the object that has been selected by a user of the user terminal by simultaneously manipulating each of the viewing fields.

12. The method according claim 11, wherein the modifying each second type of image frame to the third type of image frame includes decoding the second type of the individual image frames so that the third type of image frames are the same as the first type of image frames.

13. The method according to claim 12, wherein the request to obtain a previous image frame or a next image frame comprises one or more of timestamps, frame numbers, or image recorder identities.

14. The method according to claim 11, wherein the user terminal comprises a graphical user interface for the user to control the simultaneous manipulation of the viewing fields to select the point of time in the recorded series of images of the object in near real time with the displaying of the series of thrid type of image frames in the corresponding viewing fields for the selected point of time.

* * * * *